B. E. D. STAFFORD AND E. I. DODDS.
STAY BOLT STRUCTURE.
APPLICATION FILED MAY 14, 1918.
1,313,647.
Patented Aug. 19, 1919.
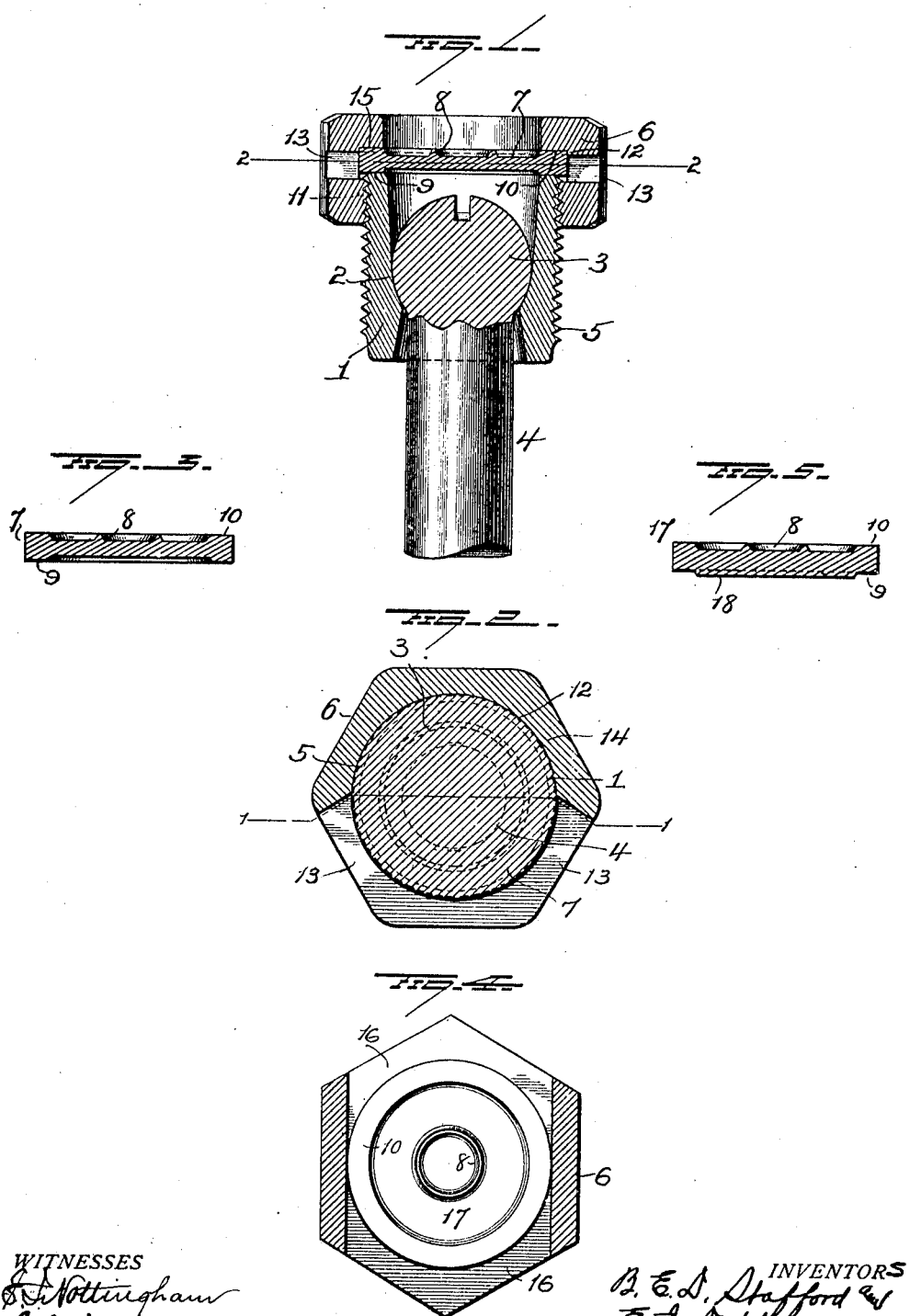

UNITED STATES PATENT OFFICE.

BENJAMIN E. D. STAFFORD AND ETHAN I. DODDS, OF PITTSBURGH, PENNSYLVANIA, ASSIGNORS TO FLANNERY BOLT COMPANY, OF PITTSBURGH, PENNSYLVANIA.

STAY-BOLT STRUCTURE.

1,313,647.   Specification of Letters Patent.   Patented Aug. 19, 1919.

Application filed May 14, 1918. Serial No. 234,418.

*To all whom it may concern:*

Be it known that we, BENJAMIN E. D. STAFFORD and ETHAN I. DODDS, citizens of the United States, and residents of Pittsburgh, in the county of Allegheny and State of Pennsylvania, have invented certain new and useful Improvements in Stay-Bolt Structures; and we do hereby declare the following to be a full, clear, and exact description of the invention, such as will enable others skilled in the art to which it appertains to make and use the same.

This invention relates to improvements in staybolt structures and more particularly to the closure devices for the bearing sleeve or member,—the object of the invention being to provide simple and efficient means for closing the outer end of the bearing sleeve and to so construct such means as to facilitate the quick removal of the cap or closure and thus expose the head of the bolt for testing purposes.

A further object is to provide, in a closure device for the bearing sleeve of a staybolt structure, a cap or closure in the form of a plate or disk and to so mount the latter that it will become promptly centered when placed in position; so that it will be held firmly in place normally, and so that it can be quickly removed to expose the head of the staybolt, without removing the holding or locking means.

With these and other objects in view, the invention consists in certain novel features of construction and combinations of parts as hereinafter set forth and pointed out in the claims.

In the accompanying drawings; Figure 1 is a longitudinal sectional view of a staybolt structure showing an embodiment of our invention; Fig. 2 is a transverse section on the line 2—2 of Fig. 1; Fig. 3 is a separate sectional view of the cap or closure, and Figs. 4 and 5 are views showing a modification.

1 represents a bearing sleeve or member adapted for connection with a boiler sheet, and provided interiorly with a curved face 2 constituting a bearing for the rounded or spherical head 3 of a staybolt 4.

The bearing sleeve 1 is threaded externally, as at 5, and receives a locking or securing member 6 for a cap or closure 7, the latter being adapted to seat on the outer end of the bearing sleeve and close the latter over the head of the staybolt.

The cap or closure 7 is made in the form of a plate or disk having a rib or projection 8 on its outer face,—said plate or disk also having an annular bearing face 9 to seat on the end of the sleeve 1 and an outer annular bearing face 10 to seat within the locking or holding member 6.

The locking ring or holding member 6 is made in the form of ring or annular nut having an interiorly threaded portion 11 to screw on the sleeve 1 and being made with an angular external configuration for the accommodation of a wrench.

A slot 12 is formed in the locking ring or nut 6 and its open portion 13 is of such size as will permit the insertion and removal of the cap or closure 7,—the slot being closed back of said open portion to form a wall 14 against which the edge of the cap disk may abut and thus insure the accurate seating of said cap plate when the latter is inserted through the open portion of the slot. The outer wall of the slot 12 in the locking ring or nut is made with an annular recess 15 in which the seat portion 10 of the cap plate 7 will enter when said ring or nut is screwed down, and thus said cap plate normally will be tightly clamped on the end of the bearing sleeve by the locking ring or nut and its displacement will be effectually prevented.

When it is desired to test the bolt, the operator will turn the ring or nut 6 sufficiently to move the recessed portion 15 beyond the plane of the cap plate, when the latter can be removed quickly (with the use of a suitable tool or device to engage the rib or projection 8) through the open portion 13 of the slot, and thus the head of the staybolt will be at once exposed for testing purposes.

In the form of the invention shown in Fig. 4, the nut or locking member is provided with two diametrically opposite open slot portions 16—16 and the cap plate 17 is made on its bottom with a slight circular enlargement 18 (Fig. 5) to facilitate the centering of said cap plate when the same is inserted through either of said open slot portions.

Having fully described our invention what we claim as new and desire to secure by Letters-Patent, is:—

1. In a staybolt structure, the combination with a bearing member for a staybolt, and a removable cap plate for closing the same, of an annular locking member adjustably connected with said bearing member and provided with a seat having an open portion, said locking member adapted to seat on the cap plate.

2. In a staybolt structure, the combination with a bearing member for a staybolt, and a cap plate to seat thereagainst, of a locking member adjustable on said bearing member and provided with a slot having an open portion of the passage of the cap plate and a closed portion forming an abutment for said cap plate, said locking member adapted to seat against said cap plate.

3. In a staybolt structure, the combination with a bearing member for a staybolt, and a removable cap plate to seat thereagainst, of an annular locking member adjustable on said bearing member and having a slotted portion permitting the insertion and removal of said cap plate, said locking member having a recessed portion in which the cap member is normally seated.

4. In a staybolt structure, the combination with a bearing member for a staybolt, of a removable cap plate to seat thereagainst, and an annular locking member adjustable on the bearing member and having a slotted portion permitting the insertion and removal of said cap plate, said cap plate having a tool-engaging portion accessible through said locking member.

In testimony whereof I have signed this specification in the presence of two subscribing witnesses.

BENJAMIN E. D. STAFFORD.

Witnesses:
R. S. FERGUSON,
G. F. DOWNING.

In testimony whereof I have signed this specification in the presence of two subscribing witnesses.

ETHAN I. DODDS.

Witnesses:
EDWIN S. RYCE,
C. O. VETTERS.

Copies of this patent may be obtained for five cents each, by addressing the "Commissioner of Patents, Washington, D. C."